United States Patent
Woolley et al.

(10) Patent No.: US 6,616,182 B2
(45) Date of Patent: Sep. 9, 2003

(54) INFLATABLE RESTRAINT SYSTEM AND METHOD OF DEPLOYMENT

(75) Inventors: Janice L Woolley, Goodrich, MI (US); John Zlotecki, Ortonville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/074,897

(22) Filed: Feb. 13, 2002

(65) Prior Publication Data

US 2003/0151238 A1 Aug. 14, 2003

(51) Int. Cl.[7] .......................... B60R 21/16; B60R 21/20
(52) U.S. Cl. .................. 280/732; 280/728.2; 280/728.3
(58) Field of Search .............................. 280/732, 728.3, 280/728.2

(56) References Cited

U.S. PATENT DOCUMENTS

| 4,893,833 A | | 1/1990 | DiSalvo et al. ............. 280/732 |
| 5,158,322 A | | 10/1992 | Sun ............................ 280/732 |
| 5,217,253 A | | 6/1993 | Pray ........................... 280/732 |
| 5,322,324 A | | 6/1994 | Hansen et al. ............. 280/732 |
| 5,344,184 A | * | 9/1994 | Keeler et al. ............. 280/730.1 |
| 5,374,078 A | | 12/1994 | Amamori et al. ....... 280/728 B |
| 5,398,959 A | | 3/1995 | Avila ...................... 280/728 B |
| 5,443,285 A | * | 8/1995 | Boll ........................... 280/732 |
| 5,480,183 A | | 1/1996 | Ward et al. .............. 280/728.2 |
| 5,556,126 A | | 9/1996 | Lee .......................... 280/728.3 |
| 5,613,701 A | | 3/1997 | Bentley et al. .......... 280/728.3 |
| 5,647,607 A | | 7/1997 | Bolieau .................... 280/728.2 |
| 5,662,351 A | | 9/1997 | Phillion et al. .......... 280/728.3 |
| 5,842,717 A | * | 12/1998 | Wohllebe et al. ............ 280/734 |
| 5,975,563 A | | 11/1999 | Gallagher et al. ........ 280/728.3 |
| 6,042,139 A | | 3/2000 | Knox ....................... 280/728.3 |
| 6,068,286 A | * | 5/2000 | Heilig ..................... 280/728.3 |
| 6,203,056 B1 | | 3/2001 | Labrie et al. ............ 280/728.3 |
| 6,250,669 B1 | | 6/2001 | Ohmiya ...................... 280/732 |
| 6,283,498 B1 | | 9/2001 | Breitweg ................. 280/728.3 |
| 6,315,321 B1 | * | 11/2001 | Lutz ......................... 280/728.3 |
| 6,357,785 B1 | * | 3/2002 | Heilig ..................... 280/728.2 |
| 6,364,345 B1 | * | 4/2002 | Lang ....................... 280/728.3 |
| 6,416,078 B1 | * | 7/2002 | Lutz et al. ............... 280/728.2 |
| 6,523,854 B1 | * | 2/2003 | Muller .................... 280/728.3 |

FOREIGN PATENT DOCUMENTS

DE 19757437 A1 * 7/1998

* cited by examiner

Primary Examiner—Paul N. Dickson
Assistant Examiner—Ruth Ilan
(74) Attorney, Agent, or Firm—Laura C. Hargitt

(57) ABSTRACT

An inflatable restraint assembly and method of deploying an inflatable restraint assembly in a vehicle includes a support structure mounted below an opening in the instrument panel adapted to receive an air bag deployment door. An air bag module includes a deployable air bag disposed within an air bag housing pivotally mounted to the support structure. An air bag deployment door is pivotally mounted to the housing of the air bag module and is movable between an installed position mounted adjacent the opening in the instrument panel and a deployed position wherein the door is received within the cavity in the instrument panel.

20 Claims, 3 Drawing Sheets

INFLATABLE RESTRAINT SYSTEM AND METHOD OF DEPLOYMENT

BACKGROUND OF THE INVENTION

1. Field of the Invention

The present invention relates to an inflatable restraint system and a method of deploying an inflatable restraint system in a vehicle.

2. Background Art

Inflatable restraint systems, such as air bags, are standard safety features incorporated in the passenger compartments of vehicles. Inflatable restraint systems cooperate with seat and lap belt mechanisms to restrict occupant movement during a vehicle collision. Most inflatable restraint systems generally include an air bag coupled to an inflator disposed within the hub of a steering wheel or in a compartment in the vehicle instrument panel.

A passenger side inflatable restraint system is typically disposed adjacent an opening formed in an upper surface of the instrument panel. A door or cover provided over the opening, either integrally formed in the instrument panel skin or mounted flush to the instrument panel, maintains the overall aesthetic appearance of the instrument panel. During a vehicle collision, a control module senses a predetermined deceleration in the vehicle, signaling the inflator to inflate the air bag. The air bag inflates upward through the opening in the instrument panel, thereby engaging the lower surface of the door or cover to remove the door from the instrument panel. However, due to the amount of force applied to the door by the air bag inflation, the door must be securely attached to the instrument panel to prevent unwanted detachment during deployment.

A variety of door mounting arrangements have conventionally been used to retain the door adjacent the opening in the instrument panel. One prior art mounting arrangement provides a door hingedly mounted to the opening in the instrument panel allowing the door to pivot forward towards the windshield. Another common mounting arrangement provides a door having weakened seams integrally formed in the instrument panel disposed adjacent an opening in the instrument panel to separate the door from the instrument panel upon deployment of the air bag. A tether is secured to the door and a portion of the instrument panel to secure the door to the instrument panel.

One disadvantage of these mounting arrangements is that the door may cause damage to the instrument panel and passenger compartment due to the force applied to the door by the deployment of the air bag. This is especially problematic where the inflatable restraint system is activated in low speed collisions which do not cause significant damage to the vehicle. Other vehicle components may be also be damaged by the deployed door.

SUMMARY OF THE INVENTION

The present invention overcomes the above-referenced problems by providing a deployment door hingedly connected to the air bag module which retracts into the opening in the instrument panel upon deployment of the air bag. An inflatable restraint assembly for a vehicle comprises an instrument panel having an opening defined in an outer surface to receive an air bag deployment door. A support structure is secured to the frame of the vehicle below the opening in the instrument panel in a cavity defined by an inner surface of the instrument panel. An air bag module is pivotally secured to the support structure adjacent the opening in the instrument panel.

The air bag module includes a housing, an inflator disposed within the housing and an air bag operatively connected to the inflator to deploy through the opening in the instrument panel. An air bag deployment door is pivotally mounted to the housing of the air bag module and cooperates with the opening in the instrument panel to cover the air bag module in the instrument panel. The air bag deployment door is movable between an installed position disposed in the opening in the instrument panel and a deployed position wherein the door is received within the cavity in the instrument panel. The door cooperates to deploy the air bag through the opening in the instrument panel into the passenger compartment of the vehicle.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
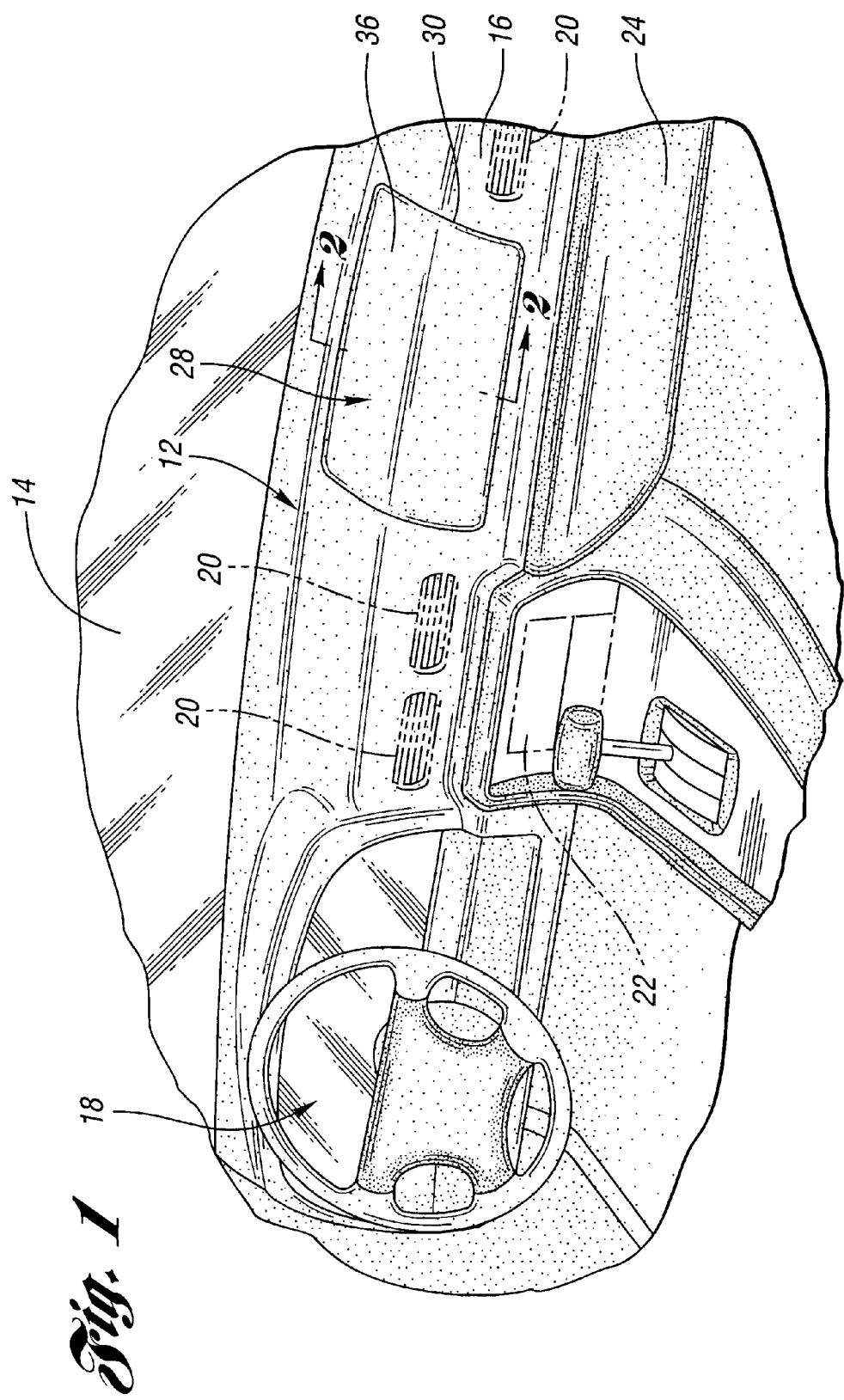
FIG. 1 shows a fragmentary perspective view of an instrument panel of a vehicle incorporating an inflatable restraint system in accordance with the present invention.

Referring now to the Figures, an inflatable restraint system of the present invention is disposed within the instrument panel 12 of a vehicle. FIG. 1 shows a perspective view of an instrument panel 12 installed adjacent a windshield 14 in a passenger compartment of a vehicle. A variety of vehicle components are provided in the outer surface 16 of the instrument panel 12, including a vehicle instrument display 18, vents 20 for a heating and cooling system, as well as electrical components 22, such as a radio, information display unit or the like. A glove box door 24 is hingedly connected to an inner surface of glove box compartment 26 in instrument panel 12.

An air bag deployment door 28 is disposed in an opening 30 formed in the outer surface 16 of instrument panel 12. Air bag deployment door 28 includes a structural member 32 having a top surface 34 supporting an overlay 36. The top surface 34 of air bag deployment door 28 may be contoured to the shape of the outer surface 16 of instrument panel 12. Overlay 36 generally comprises a polymeric substrate with an outer decorative skin 38 applied thereon. Alternatively, overlay 36 comprises a single polymeric material forming both a substrate and the outer decorative skin.

In one embodiment of the invention, overlay 36 for air bag deployment door 28 is integrally formed as part of an outer decorative skin 40 applied to the instrument panel 12. In this embodiment, outer decorative skin 40 includes the deployment door overlay 36 defined by a series of frangible tear seams corresponding to the opening 30 formed in instrument panel 12. Alternatively, overlay 36 is formed as a separate matching skin from outer decorative skin 40 of instrument panel 12 and is adhered to the top surface 34 of air bag deployment door 28 to provide a surface flush to the skin 40 of instrument panel 12.

Figure 2:
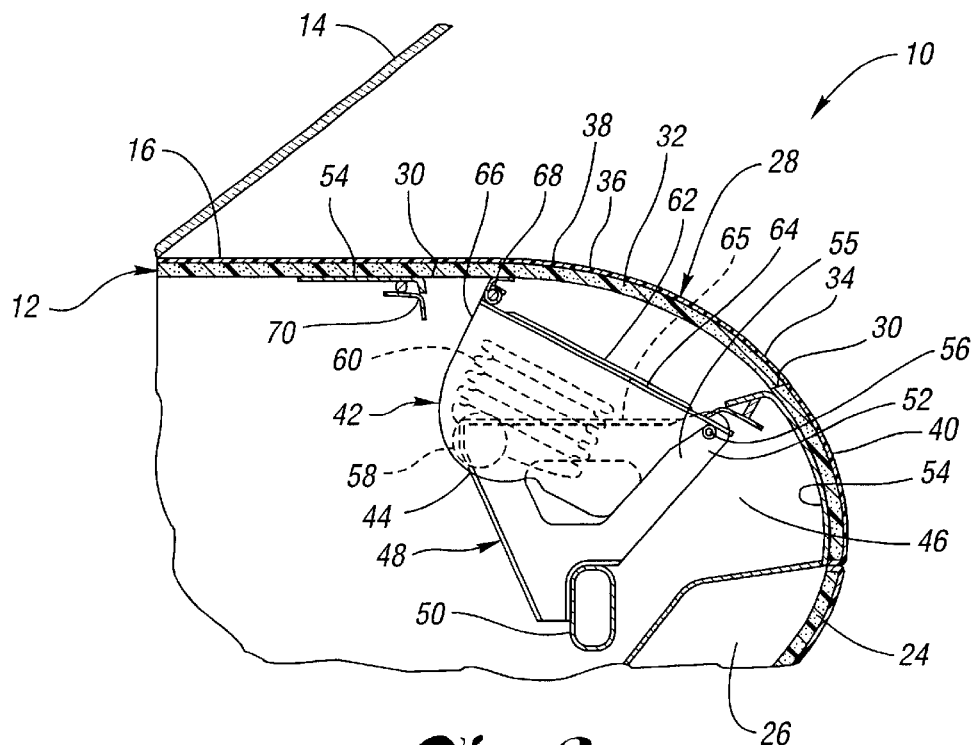
FIG. 2 is a cross-sectional view along line 2—2 of FIG. 1 of an inflatable restraint system installed in an instrument panel of a vehicle in accordance with a first embodiment of the present invention.
Figure 3:
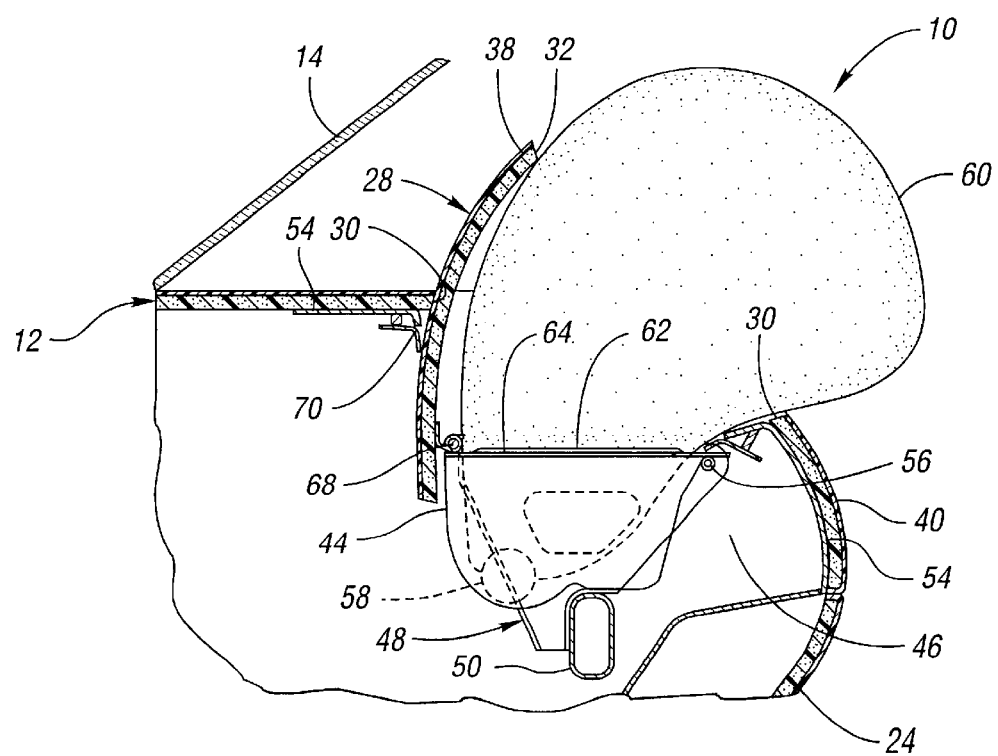
FIG. 3 shows a cross-sectional view of the first embodiment of the inflatable restraint system deployed through the instrument panel of a vehicle.

Referring to FIGS. 2 and 3, the first embodiment of the inflatable restraint system 10 of the present invention is discussed in greater detail. Inflatable restraint system 10 comprises an air bag module 42 including an air bag canister or housing 44 disposed within a cavity 46 defined by the inner surface of instrument panel 12. A support structure or mounting bracket 48 is fixedly secured to a cross car structural beam 50 extending through cavity 46 between opposing sides of the vehicle frame (not shown). A receiving member 52 extends upward from a rear portion of bracket 48 and is affixed to a frame 54 receiving instrument panel 12 thereon. Receiving member 52 of bracket 48 cooperates with cross car structural beam 50 and frame 54 to structurally support the air bag housing 44 on bracket 48. A rear portion 55 of air bag housing 44 is pivotally mounted to the fixed receiving member 52 of bracket 48 at hinge 56.

The air bag module 42 of inflatable restraint system 10 includes an igniter unit, an inflator, generally referenced by numeral 58, and an inflatable air bag 60, operatively secured to housing 44. In the uninflated state shown in FIG. 2, air bag 60 is stored in the housing 44 in a folded state to minimize storage space in the housing. An opening 62 is formed in an upper surface 64 of the air bag housing 44. Air bag module 42 is positioned on mounting bracket 48 to place opening 62 in housing 44 adjacent the air bag deployment door 28 in the opening 30 in instrument panel 12. The door 28 is hingedly connected at a proximate end to a front portion 66 of the upper surface 64 of housing 44 at hinge 68. Hinge 68 allows the door 28 to rotate relative to the housing 44 during deployment of the air bag. A door stop 70 is mounted to frame 54 adjacent the forward edge of air bag module 42 to guide the air bag deployment door through opening 30 into cavity 46 when air bag module 44 is deployed.

FIG. 3 shows the inflatable restraint system 10 in the deployed position. Inflator 58 is activated in response to a signal generated by a control module detecting a predetermined change in velocity or deceleration of the vehicle to inflate air bag 60. Inflated air bag 60 deploys upwardly through opening 62 in air bag housing 44 to engage a lower surface of structural member 32 of air bag deployment door 28. The force of the inflated air bag 60 opens the air bag deployment door 28 by severing the door from the balance of the instrument panel at the tear seams. The door 28 pivots forward, about hinge 68 disposed on air bag housing 44, toward the windshield 14.

Since the deployment door 28 is connected to the air bag housing 44 at hinge 68, the forward rotation of door 28 forces air bag housing 44 to pivot downward through the instrument panel cavity 46 about the fixed hinge 56 on mounting bracket 48. The downward travel of air bag housing 44 causes door 28 to travel downward through the opening 30 in instrument panel 12 into cavity 46. Door stop 70 prevents instrument panel fragmentation from the door forces and induces hinging of the door 28 to minimize the likelihood of contacting the windshield 14. The upper surface 64 of air bag housing 44 engages an upper lip 65 of mounting bracket 48 to stop the travel of the housing 44 through cavity 46. Alternatively, the lower end of housing 44 may engage mounting bracket 48 to stop the travel of the housing 44. Once fully inflated, air bag 60 extends over the passenger side of the instrument panel 12.

Figure 4:
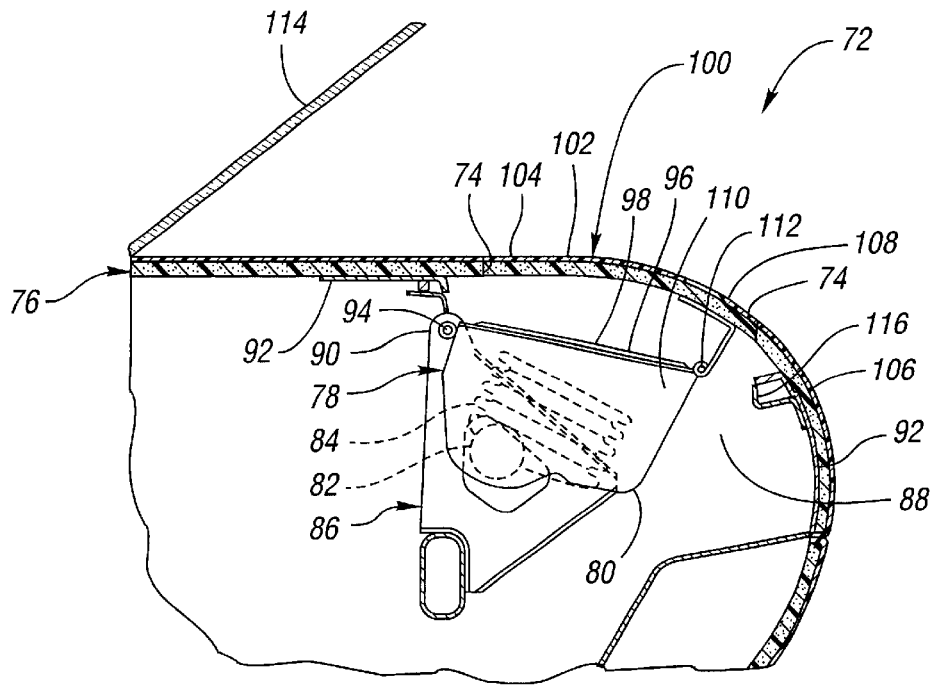
FIG. 4 is a cross-sectional view along line 2—2 of FIG. 1 of an inflatable restraint system installed in an instrument panel of a vehicle in accordance with a second embodiment of the present invention.
Figure 5:
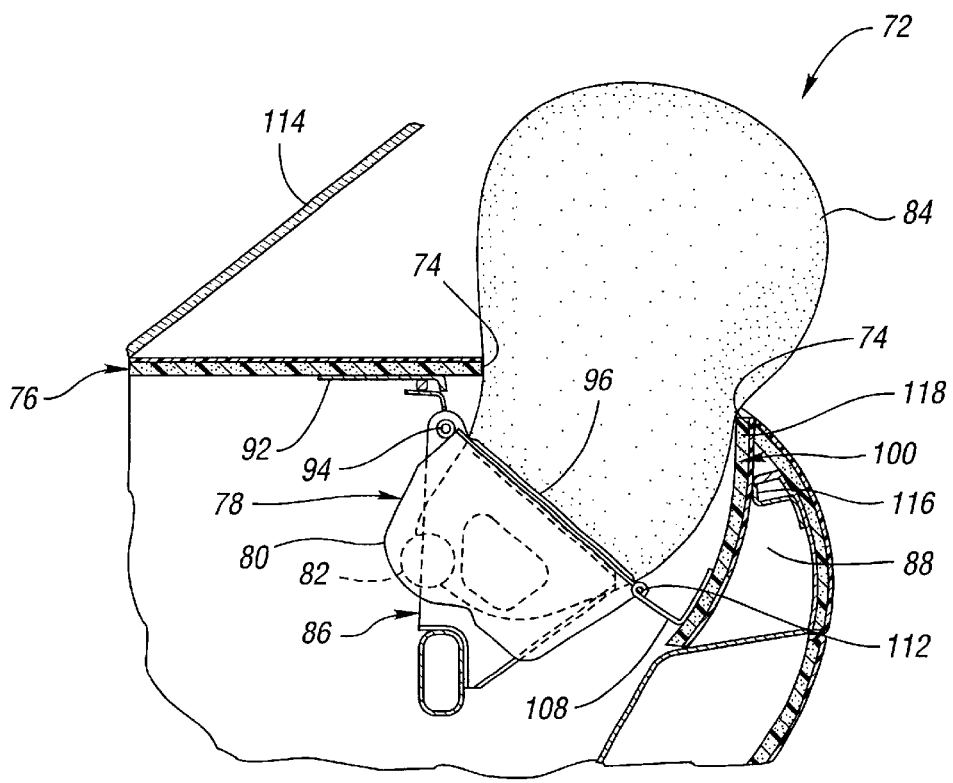
FIG. 5 shows a cross-sectional view of the second embodiment of the inflatable restraint system deployed through the instrument panel of a vehicle.

Referring to FIGS. 4 and 5, the second embodiment of the inflatable restraint system of the present invention is disclosed. Inflatable restraint system 72 is disposed below an opening 74 in instrument panel 76. Inflatable restraint system 72 includes an air bag module 78 having a housing 80, an inflator 82 disposed within the housing 80, an inflatable air bag 84 operatively connected to inflator 82 and a plurality of tethers (not shown) securing air bag 84 to housing 80.

A mounting bracket 86 is provided below instrument panel 76 in cavity 88 to receive air bag module 78. Mounting bracket 86 includes a receiving member or flange 90 formed on a forward portion of bracket 86 extending upward toward the instrument panel 76. A portion of the receiving member or flange 90 is secured to the vehicle frame 92 supporting instrument panel 76. A hinge 94, disposed on receiving member 90, pivotally mounts a forward portion of the air bag housing 80 to bracket 86.

FIG. 4 illustrates the second embodiment of the inflatable restraint system 72 in an installed position in instrument panel cavity 88. An opening 96 in the upper surface 98 of air bag housing 80 is placed adjacent to and below the opening 74 in instrument panel 76. An air bag deployment door 100 is disposed in opening 74 to place the outer decorative skin 102 applied to the top surface 104 of the door 100 flush with skin 106 on instrument panel 76. A proximate end 108 of door 100 is connected to a rear portion 110 of the upper surface of housing 80 by hinge 112.

As is shown in FIG. 5, air bag 84 of inflatable restraint system 72 is deployed through instrument panel 76 of the vehicle. Air bag module 78 is positioned on bracket 86 to place opening 96 in air bag housing 80 adjacent opening 74 in instrument panel 76. Air bag 84 deploys upwardly through the opening 96 in housing 80 to engage a bottom surface of air bag deployment door 100. The force exerted by inflating air bag 84 causes air bag deployment door 100 to open and pivot rearward away from the windshield 114 towards the passenger compartment about hinge 112 on the rear portion 110 of housing 80.

The rearward movement of door 100 is translated to air bag housing 80, causing housing 80 to pivot downward relative to the instrument panel 76 about hinge 94 on mounting bracket 86. A door stop 116 is mounted to the vehicle frame 92 adjacent a rear portion of instrument panel cavity 88. Door stop 116 prevents the rearward travel of the door 98 into instrument panel 12 or into contact with a passenger in the passenger compartment while guiding deployment door 100 downward through the opening 74 in instrument panel 76. The downward translation of air bag housing 80 in the instrument panel cavity 88 displaces door 100 downward within the instrument panel cavity 88.

In both the first and second embodiments of the invention, the displacement position of the air bag deployment door relative to the opening in the instrument panel is dependent on the packaging and design requirements of the vehicle. For example, in one aspect of the invention, the distal end 118 of the air bag deployment door is positioned below the opening in the instrument panel when the air bag is deployed as shown in FIG. 5. In another aspect of the invention, the distal end of air bag deployment door may protrude above the opening in the instrument panel after deployment as shown in FIG. 3. The lower surface of the air bag deployment door provides a barrier in the instrument panel cavity and acts as a ramp to direct the air bag through the opening to ensure the air bag deploys into the passenger compartment.

A method of deploying an inflatable restraint system of the present invention is described in greater detail. An instrument panel having an opening defined in an outer surface and a cavity defined by an inner surface is provided adjacent a passenger seat in a vehicle. An air bag module is disposed below the opening in the instrument panel and includes a housing which is pivotally secured to a support structure mounted to a vehicle frame in the cavity. A front or rear portion of the air bag housing may be pivotally mounted to the support structure based on vehicle packaging requirements. An air bag deployment door is pivotally secured to the air bag housing to position the door adjacent the opening in the instrument panel. The air bag deployment door is pivotally mounted to the housing opposite the mount for the support structure.

A control module or controller monitors the vehicle conditions during operation. If the control module detects a predetermined deceleration in the vehicle, the control module will transmit a signal to an inflator disposed with the air bag housing. The inflator expands the air bag packaged within the air bag housing to deploy the bag through an opening in the upper surface of the housing. The air bag deploys upward into the opening in the instrument panel, engaging a lower surface of the structural member of the air bag deployment door.

The force of the deploying air bag, about 6000 Newtons, forces the air bag deployment door to open and pivot about the air bag housing from the installed position disposed adjacent the instrument panel opening towards a deployed position. The force of the air bag against the door also pivots the air bag housing about the support structure downward relative to the instrument panel opening. As the air bag housing translates downward, the air bag deployment door is drawn through the instrument panel opening into the cavity along the door stop. The door acts as both a barrier to restrict deployment of the air bag into the instrument panel cavity and to guide the air bag through the opening in the instrument panel. It is understood that the distal end of the door may either extend through the instrument panel opening or, alternatively, may be completely received within the instrument panel cavity in the deployed position. The downward travel of the air bag housing in the cavity is stopped by the support structure.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An inflatable restraint system for a vehicle, the inflatable restraint system comprising:
   an instrument panel having an opening formed therethrough and having a cavity disposed below the opening;
   a support structure mounted within the cavity below the opening in the instrument panel;
   an air bag module cooperating with the opening in the instrument panel having a housing pivotally secured to the support structure, an inflator disposed within the housing and an air bag operatively connected to the inflator deployable through the opening in the instrument panel; and
   an air bag deployment door pivotally mounted to the housing, wherein the door is movable between an installed position disposed within the opening in the instrument panel and a deployed position received within the cavity in the instrument panel when the air bag engages the door to pivot the door about the housing.

2. The inflatable restraint system of claim 1, wherein the air bag housing includes a front portion pivotally secured to the support structure and a rear portion pivotally receiving the air bag deployment door.

3. The inflatable restraint system of claim 1, wherein the air bag housing includes a front portion pivotally receiving the air bag deployment door and a rear portion pivotally secured to the support structure.

4. The inflatable restraint system of claim 1, wherein the support structure further comprises a mounting bracket secured to a vehicle frame within the cavity below the opening in the instrument panel adapted to receive the air bag housing.

5. The inflatable restraint system of claim 4, wherein the mounting bracket further comprises a receiving member extending from an upper portion of the bracket and a hinge disposed on the receiving member to pivotally mount the air bag housing to the bracket.

6. The inflatable restraint system of claim 1, wherein an overlay is secured to a top surface of the air bag deployment door.

7. The inflatable restraint system of claim 6, wherein the overlay secured to the top surface of the air bag deployment door is integrally formed into a covering applied to the outer surface of the instrument panel.

8. The inflatable restraint system of claim 6, wherein the overlay secured to the top surface of the air bag deployment door cooperates with the covering applied to the outer surface of the instrument panel to create a generally planar top surface of the instrument panel.

9. The inflatable restraint system of claim 1, wherein the force applied by the air bag to a lower surface of the air bag deployment door forces the air bag housing to pivot about the support structure downward relative to the opening in the instrument panel.

10. The inflatable restraint system of claim 1, wherein the air bag housing includes an opening formed in an upper surface cooperating with the instrument panel opening to allow the air bag to deploy through the instrument panel opening.

11. The inflatable restraint system of claim 1, wherein the air bag deployment door guides the air bag through the openings in the air bag housing and instrument panel in the deployed position.

12. An inflatable restraint system disposed adjacent an opening formed in an upper surface of an instrument panel of a vehicle, the inflatable restraint system comprising:
    a support structure mounted below the opening in the instrument panel;
    an air bag module having a housing pivotally secured to the support structure, an inflator disposed within the housing and an air bag operatively connected to the inflator deployable through the instrument panel opening; and
    an air bag deployment door pivotally mounted to the housing, wherein the door is movable between an installed position disposed in the opening in the instrument panel and a deployed position received within the instrument panel when the deploying air bag engages the door to pivot the door about the housing into a cavity in the instrument panel.

13. The inflatable restraint system of claim 12, wherein the air bag housing includes a front portion pivotally secured to a receiving member of the support structure and a rear portion pivotally receiving the air bag deployment door.

14. The inflatable restraint system of claim 12, wherein the air bag housing includes a front portion pivotally receiving the air bag deployment door and a rear portion pivotally secured to the receiving member of the support structure.

15. The inflatable restraint system of claim 12, wherein the force applied by the air bag to a lower surface of the air bag deployment door forces the air bag housing to pivot about the support structure downward relative to the opening in the instrument panel.

16. The inflatable restraint system of claim 12, wherein the air bag housing includes an opening formed in an upper surface cooperating with the instrument panel opening to allow the air bag to deploy through the instrument panel opening.

17. The inflatable restraint system of claim 16, wherein the air bag deployment door guides the air bag through the openings in the air bag housing and instrument panel in the deployed position.

18. A method of deploying an inflatable restraint system through an opening defined in an outer surface of an instrument panel of a vehicle, the method comprising:

providing an air bag module below the opening in the instrument panel, the module including a housing pivotally secured to a support structure provided within a cavity in the instrument panel, an inflator disposed within the housing and an air bag operatively connected to the inflator;

providing an air bag deployment door pivotally secured to the air bag housing extending adjacent the opening in the instrument panel;

deploying the air bag against the air bag deployment door;

pivoting the air bag deployment door about the air bag housing between an installed position and a deployed position when the deploying air bag engages a lower surface of the door; and pivoting the air bag housing downward relative to the opening in the instrument panel in response to the door pivoting about the air bag housing.

19. The method of claim 18 wherein the method further comprises providing an air bag housing having a front portion of the air bag housing pivotally secured to a receiving member of the support structure and a rear portion pivotally securing the air bag deployment door.

20. The method of claim 18 wherein the method further comprises providing an air bag housing having a front portion of the air bag housing pivotally securing the air bag deployment door and a rear portion pivotally secured to the receiving member of the support structure.

* * * * *